United States Patent
Matsumoto

(10) Patent No.: US 9,285,094 B2
(45) Date of Patent: Mar. 15, 2016

(54) VEHICLE LAMP UNIT

(71) Applicant: KOITO MANUFACTURING CO., LTD., Tokyo (JP)

(72) Inventor: Akinori Matsumoto, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 24 days.

(21) Appl. No.: 14/226,066

(22) Filed: Mar. 26, 2014

(65) Prior Publication Data
US 2014/0293633 A1    Oct. 2, 2014

(30) Foreign Application Priority Data

Mar. 27, 2013 (JP) ................................ 2013-066565

(51) Int. Cl.
*F21V 1/10* (2006.01)
*F21S 8/10* (2006.01)
*B60Q 1/08* (2006.01)

(52) U.S. Cl.
CPC . *F21V 1/10* (2013.01); *B60Q 1/085* (2013.01); *F21S 48/1159* (2013.01); *F21S 48/14* (2013.01); *F21S 48/1794* (2013.01); *B60Q 2300/112* (2013.01); *B60Q 2300/122* (2013.01); *B60Q 2300/41* (2013.01); *B60Q 2300/42* (2013.01); *B60Q 2300/45* (2013.01); *F21S 48/1163* (2013.01)

(58) Field of Classification Search
CPC ............... B60Q 2300/056; B60Q 2300/41; F21S 8/12; F21S 48/1794; F21S 48/14; F21S 48/1163; F21V 1/10
See application file for complete search history.

(56) References Cited

U.S. PATENT DOCUMENTS

| | | | | |
|---|---|---|---|---|
| 5,645,338 A | * | 7/1997 | Kobayashi | 362/466 |
| 2010/0033978 A1 | * | 2/2010 | Ehm | 362/465 |
| 2011/0025209 A1 | * | 2/2011 | Nakanishi et al. | 315/82 |
| 2012/0314434 A1 | * | 12/2012 | Park et al. | 362/465 |
| 2013/0039080 A1 | * | 2/2013 | Yamazaki et al. | 362/465 |

FOREIGN PATENT DOCUMENTS

| | | |
|---|---|---|
| JP | 2010-232081 A | 10/2010 |
| JP | 2011-005992 A | 1/2011 |

OTHER PUBLICATIONS

Communication dated Dec. 3, 2015, from the State Intellectual Property Office of People's Republic of China in counterpart Application No. 201410117795.4.

* cited by examiner

*Primary Examiner* — Jong-Suk (James) Lee
*Assistant Examiner* — Eric Eide
(74) *Attorney, Agent, or Firm* — Sughrue Mion, PLLC

(57) ABSTRACT

There is provided a lamp unit which is to be installed in a vehicle. The lamp unit includes a light source; a projector lens; a rotary shade that is disposed behind the projector lens so as to block a portion of the light emitted from the light source and that has a rotation axis; and a drive mechanism that rotates the rotary shade about the rotation axis. The rotary shade includes: a first end edge; a second end edge; and a twisted end edge that extends around the rotation axis so as to intersect with the first end edge and the second end edge. A first inclination angle is formed between the rotation axis and a first imaginary plane that is orthogonal to an optical axis of the projector lens.

11 Claims, 11 Drawing Sheets

VEHICLE LAMP UNIT

CROSS-REFERENCE TO RELATED APPLICATION

This application claims priority from Japanese Patent Application No. 2013-066565, filed on Mar. 27, 2013, the entire contents of which are hereby incorporated by reference

BACKGROUND

1. Technical Field

The present disclosure relates to a lamp unit installed to a headlamp of a vehicle.

2. Background Art

Known lamp units of this type are provided with a component known as a rotary shade. A rotary shade is a component with a rotation axis that extends in a vehicle left-right direction, and plural light blocking plates with mutually different end edge shapes are provided at different angle positions around the circumferential direction (see, for example, JP-A-2011-5992).

The rotary shade is rotated about the rotation axis to provide one of the plural light blocking plates on a light path between a light source and a projector lens. A portion of light emitted by the light source is thereby blocked, and the shape of an end edge is projected through the projector lens to the front of the vehicle. A portion of a peripheral edge of a light distribution pattern formed in front of the vehicle has a shape corresponding to the shape of the end edge. By selecting one of light blocking plates that are disposed on the light path, plural light distribution patterns can be formed selectively using a single light source.

Known plural light distribution patterns include low beam patterns that illuminate a short distance ahead so as not to give glare to vehicles ahead, and high beam patterns that illuminate a broad range far ahead. Moreover, light distribution patterns are known that can both suppress glare and secure forward visibility in a high beam illumination state by forming a shadow region for only regions ahead where a vehicle or a pedestrian have been detected. In the present specification, such light distribution patterns are referred to as "partial high beam patterns".

As described in JP-A-2011-5992, a left side partial high beam pattern is formed with an upper right portion of the high beam pattern of the left headlamp as a shadow region, and a right side partial high beam pattern is formed with an upper left portion of the high beam pattern of the right headlamp as a shadow region. The partial high beam pattern described above can be formed by superimposing these light distribution patterns. The position and size of the shadow region can be changed by performing swivel control to turn the optical axis of the lamp unit in the left-right direction.

Rotary shades are known that are provided with a twisted end edge that extends about the rotation axis so as to connect together different positions along the rotation axis direction (see, for example, JP-A-2010-232081). The twisted end edge is projected as the boundary of a shadow region partially formed within a high beam pattern. The rotation axis direction position of the twisted end edge changes in response to rotation of the rotary shade. The position of the boundary with the shadow region, namely the position and size of the shadow region, can thereby be changed according to the positions of vehicles, pedestrians and the like ahead that are not to be illuminated.

A peripheral face extending around the rotation axis of the rotary shade is needed in order to form the twisted end edge. In order to increase the movement range of the boundary with the shadow region in response to the rotary shade rotation, the incline of the straight line that joins together the "different positions along the rotation axis direction" in an opened-out view of the peripheral face may be brought closer to a direction running parallel to the rotation axis.

However, the incline of the twisted end edge that is employed in projection is lessened, and the boundary with the shadow region becomes indistinct. Moreover, the amount of light projecting toward the projector lens that is blocked by an end face of the rotary shade that includes the twisted end edge increases, with the brightness in the vicinity of the boundary thereby being lowered.

SUMMARY OF THE INVENTION

It is an illustrative object of the present invention to provide technology capable of making a boundary with a shadow region distinct and avoiding a reduction in brightness in the vicinity of the boundary whilst securing an adequate movement range of the boundary when using a rotary shade to form a partial high beam pattern.

According to one or more illustrative aspects of the present invention, there is provided a lamp unit which is to be installed in a vehicle. The lamp unit comprises: a light source; a projector lens having an optical axis, wherein at least a portion of light emitted from the light source passes through the projector lens; a rotary shade that is disposed behind the projector lens so as to block a portion of the light emitted from the light source and that has a rotation axis; and a drive mechanism that rotates the rotary shade about the rotation axis. The rotary shade comprises: a first end edge for forming a cutoff line of a first light distribution pattern projected in front of the projector lens, when the drive mechanism rotates the rotary shade to a first angle position; a second end edge for forming a first cutoff line of a second light distribution pattern projected in front of the projector lens, when the drive mechanism rotates the rotary shade to a second angle position different from the first angle position, wherein an illumination region of the second light distribution pattern is larger than that of the first light distribution pattern; a twisted end edge that extends around the rotation axis so as to intersect with the first end edge and the second end edge, wherein a position of a first intersect point of the twisted end edge and the first end edge is different from that of a second intersect point of the twisted end edge and the second end edge in a direction parallel to the optical axis, the twisted end edge for forming a second cutoff line of the second light distribution pattern, wherein the second cutoff line is shifted in accordance with the rotation of the rotary shade. A first inclination angle is formed between the rotation axis and a first imaginary plane that is orthogonal to an optical axis of the projector lens.

According to such a configuration, adjustment of the apparent incline of the twisted end edge can be made. Namely, it is possible to adjust the incline of the second cutoff line of the second light distribution pattern Appropriate adjustment of the incline enables both the distinctness of the boundary with the shadow region and a wide movement range to be secured. Moreover, a reduction in brightness in the vicinity of the boundary can be suppressed.

DETAILED DESCRIPTION

Detailed description is given below regarding an example of an exemplary embodiment of the invention with reference to the drawings provided. Note that in each of the drawings used in the following description the scale of each member has been modified where appropriate to a size that makes each section recognizable.

Figure 1:
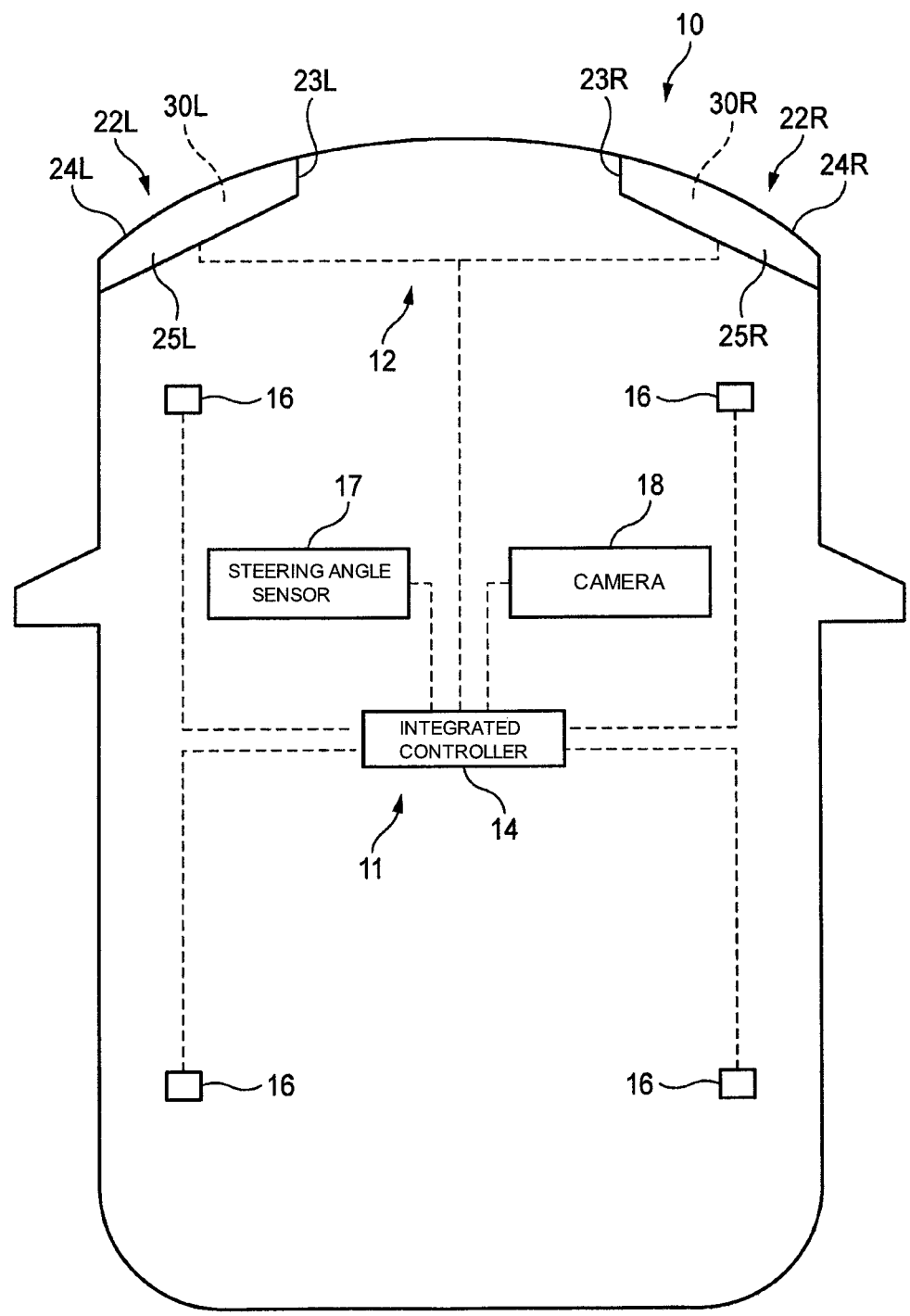
FIG. 1 is a schematic view illustrating a configuration of a vehicle installed with lamp units according to the invention.

An overall configuration of a vehicle 10 to which a headlamp device 12 of the exemplary embodiment of the invention is installed is schematically illustrated in FIG. 1. The headlamp device 12, an integrated controller 14, car wheel speed sensors 16, a steering angle sensor 17, and a camera 18 configure a headlamp control system 11.

The integrated controller 14 is provided with for example: a CPU that executes various types of computation processing; ROM that stores various types of control program; and RAM that is used as a work area for data storage and program execution. The integrated controller 14 performs various controls in the vehicle 10.

The car wheel speed sensors 16 are installed corresponding to each of the 4 wheels that are respectively assembled to the left and right at the front and back of vehicle 10. Each of the car wheel speed sensors 16 are connected to the integrated controller 14 so as to be capable of communication with the integrated controller 14, and outputs a signal to the integrated controller 14 according to the car wheel rotation speed. The integrated controller 14 uses the signal input from the car wheel speed sensors 16 to calculate the speed of the vehicle 10.

The steering angle sensor 17 is provided at the steering wheel and is connected to the integrated controller 14 so as to be capable of communication with the integrated controller 14. The steering angle sensor 17 outputs a signal to the integrated controller 14 according to the steering angle of the steering wheel set by a driver. The integrated controller 14 uses the signal input from the steering angle sensor 17 to calculate the direction of travel of the vehicle 10.

The camera 18, that is provided with an imaging element such as a Charged Coupled Device (CCD) sensor, or a Complementary Metal Oxide Semiconductor (CMOS) sensor for example, captures images in front of the vehicle, and generates image data. The camera 18 is connected to the integrated controller 14 so as to be capable of communication with the integrated controller 14, and outputs the generated image data to the integrated controller 14.

The headlamp device 12 is provided with a right headlamp unit 22R that is disposed toward the right of a vehicle 10 front portion, and a left headlamp unit 22L that is disposed toward the left of the vehicle 10 front portion. In the right headlamp unit 22R, a translucent cover 24R is mounted to a lamp body 23R, forming a partitioned lamp chamber 25R.

Figure 2:
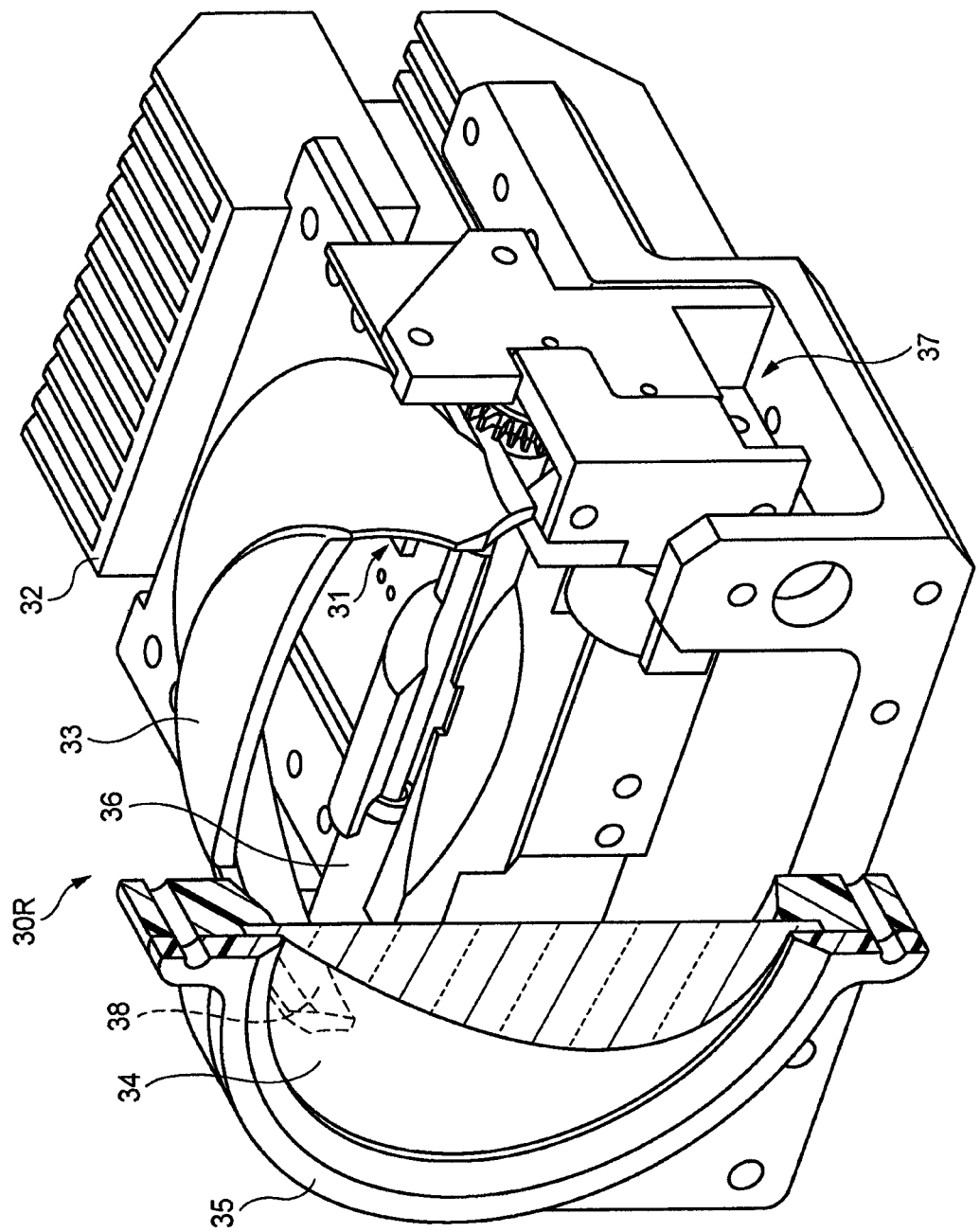
FIG. 2 is a perspective view illustrating a configuration of a right lamp unit according to an exemplary embodiment of the invention.

FIG. 2 is a perspective view illustrating a configuration of a right lamp unit 30R that is housed in the lamp chamber 25R of the right headlamp unit 22R. The right lamp unit 30R is provided with a light source 31, a heat sink 32, a reflector 33, a projector lens 34, a lens holder 35, a rotary shade 36, a drive mechanism 37, and a supporting mechanism 38.

The light source 31 is a light-emitting semiconductor element such as a white light-emitting diode (LED) or an organic EL element. The light source 31 is fixed to the heat sink 32. The heat sink 32 is formed of materials and in a shape, which are known and suitable for dispersing heat emitted from the light source 31. The light emitted by the light source 31 is reflected by the reflector 33 towards the front. At least a portion of the light passes through the projector lens 34 that is disposed in front of the reflector 33.

The projector lens 34 is made of a resin, and is a plano-convex aspherical lens with a convex front side face and a planar rear side face. A peripheral edge portion of the projector lens 34 is supported by the lens holder 35, and is fixed to the heat sink 32.

The drive mechanism 37 has a motor and a gear wheel mechanism, and rotates the rotary shade 36 about a rotation axis A1 (see FIG. 3). Specifically, the motor and the gear wheel mechanism are driven according to a control signal input from the integrated controller 14 of the vehicle 10, and the rotary shade 36 is configured so as to be rotated to an angle and a direction in accordance with the signal.

The drive mechanism 37 is fixed to an axial direction left side end portion of the rotary shade 36. The supporting mechanism 38 rotatably supports the axial direction left side end portion of the rotary shade 36. Herein, "left" and "right" indicate the left and right directions as viewed from the driver's seat.

Figure 3A:
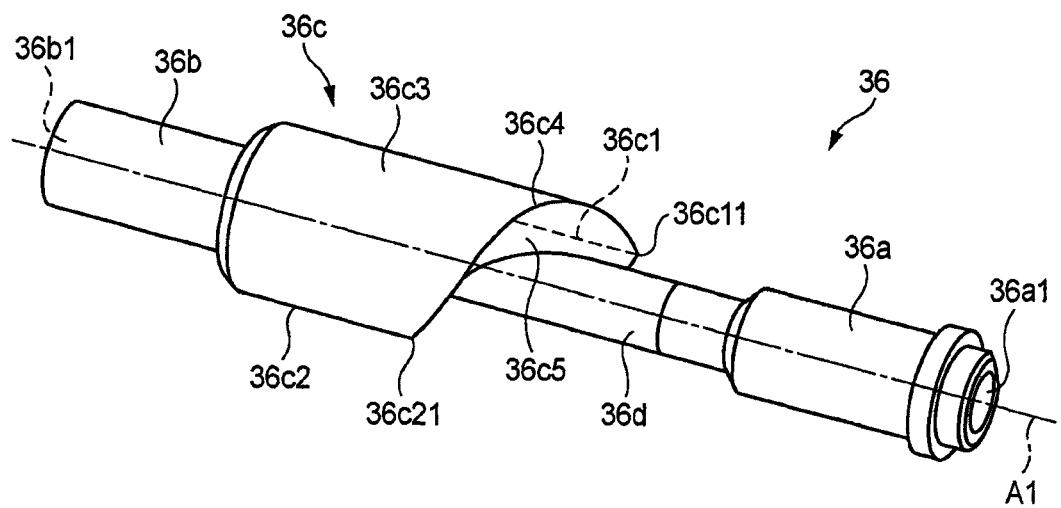
FIGS. 3A and 3B are drawings to explain a configuration of a rotary shade provided to the right lamp unit.

FIG. 3A is a perspective view illustrating the exterior of the rotary shade 36. The rotary shade 36 is provided with a left side circular cylinder portion 36a, a right side circular cylinder portion 36b, a first connecting portion 36c, and a second connecting portion 36d.

The left side circular cylinder portion 36a has a cross-section profile formed as a concentric circle centered on the rotation axis A1 as viewed along the rotation axis A1. The left side circular cylinder portion 36a is formed with a shaft hole 36a1 coaxial to the rotation axis A1. The shaft hole 36a1 connects to the drive mechanism 37.

The right side circular cylinder portion 36b has a cross-section profile formed as a concentric circle centered on the rotation axis A1 as viewed along the rotation axis A1. The right side circular cylinder portion 36b is formed with a shaft hole 36b1 coaxial to the rotation axis A1. The shaft hole 36b1 is supported by the supporting mechanism 38.

The first connecting portion 36c is formed contiguously to the right side circular cylinder portion 36b, and is disposed at a left side of the right side circular cylinder portion 36b as viewed from the driver's seat. The first connecting portion 36c has a cross-section profile of a notched concentric circle centered on the rotation axis A1 as viewed along the rotation axis A1. The radius of the concentric circle is greater than the radius of the concentric circle that forms the right side circular cylinder portion 36*b* cross-section profile.

The second connecting portion 36*d* is formed contiguously to the left side circular cylinder portion 36*a* and the first connecting portion 36*c*, and connects the left side circular cylinder portion 36*a* to the first connecting portion 36*c*. The second connecting portion 36*d* has a cross-section profile that is a notched concentric circle centered on the rotation axis A1 as viewed along the rotation axis A1. The radius of the concentric circle is less than the respective radii of the concentric circles that form the cross-section profiles of the left side circular cylinder portion 36*a* and the right side circular cylinder portion 36*b*.

The first connecting portion 36*c* is provided with a first end edge 36*c*1 and a second end edge 36*c*2. The first end edge 36*c*1 and the second end edge 36*c*2 are end edges that extend in a direction parallel to the rotation axis A1. A left end portion 36*c*11 of the first end edge 36*c*1 is closer to the left side than a left end portion 36*c*21 of the second end edge 36*c*2; namely, the left end portion 36*c*11 is positioned at a side that is closer to the left side circular cylinder portion 36*a*.

The first connecting portion 36*c* is further provided with a peripheral face 36*c*4, a twisted end edge 36*c*4, and a twisted end face 36*c*5. The peripheral face 36*c*4 is a face that extends concentric to the rotation axis A1 between the first end edge 36*c*1 and the second end edge 36*c*2. The twisted end edge 36*c*4 extends around the rotation axis A1 so as to connect the left end portion 36*c*11 of the first end edge 36*c*1 with the left end portion 36*c*21 of the second end edge 36*c*2. Namely, the twisted end edge 36*c*4 intersects with the first end edge 36*c*1 and the second end edge 36*c*2 respectively at different positions along the rotation axis A1 direction. The twisted end face 36*c*5 is formed contiguously to the twisted end edge 36*c*4 and the second connecting portion 36*d*, and is a portion that connects the twisted end edge 36*c*4 with the second connecting portion 36*d*.

Figure 4A:
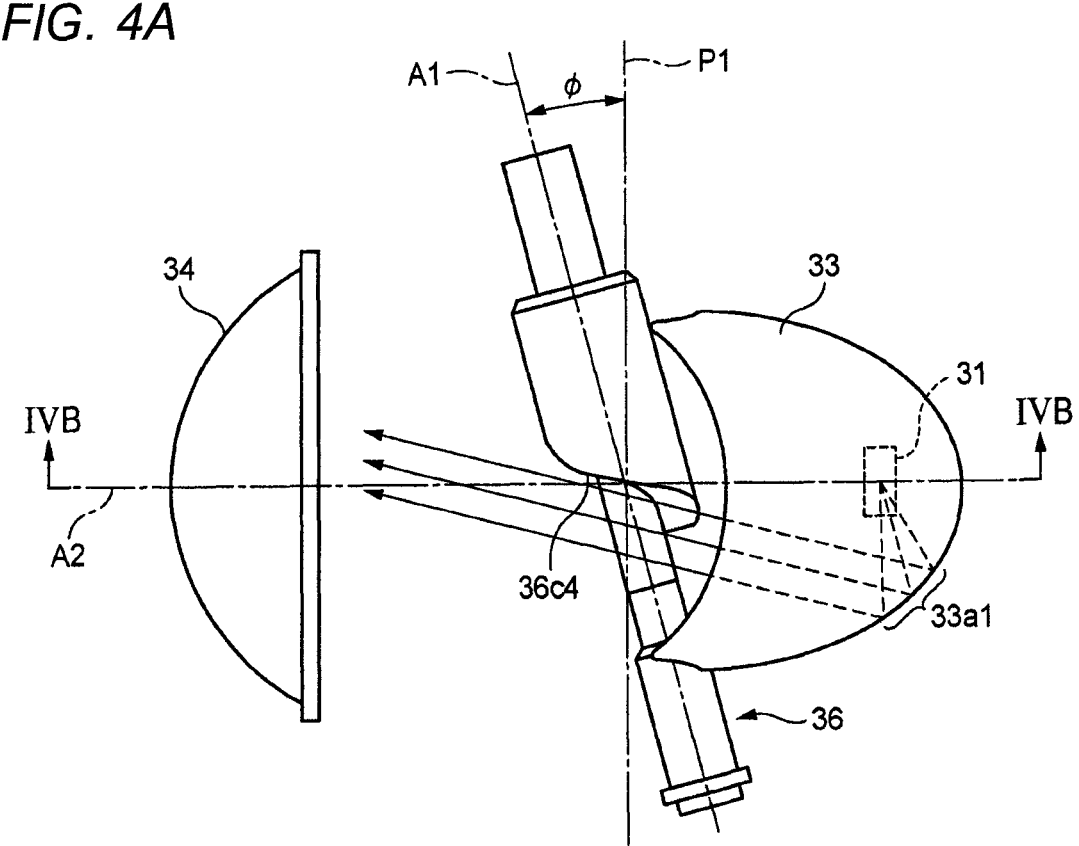
FIGS. 4A and 4B are drawings illustrating positional relationships between configuration elements of the right lamp unit.
Figure 4B:
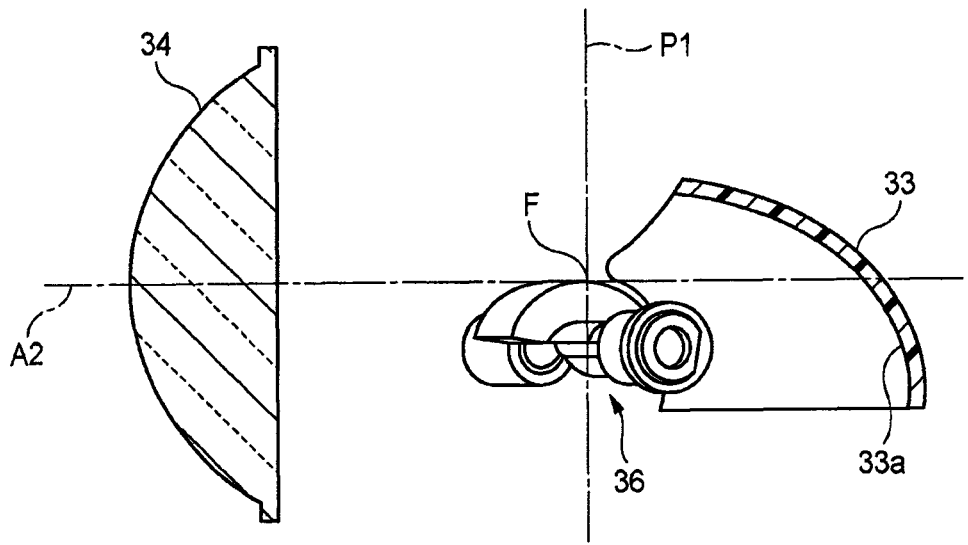

FIG. 4A is a plan view illustrating positional relationships between some elements configuring the right lamp unit 30R. FIG. 4B is a left side face view illustrating the same positional relationships. In FIG. 4B, cross-section profiles of the reflector 33 and the projector lens 34 are illustrated in a cut-away state along line IVB-IVB of FIG. 4A to aid understanding.

The rotary shade 36 is disposed behind the projector lens 34 so as to block a portion of the light emitted by the light source 31. The rotary shade 36 has the rotation axis A1, with the rotation axis A1 disposed so as to extend below a rear focal point F of the projector lens 34.

The reflector 33 is disposed on the path of the light between the light source 31 and the rotary shade 36. Light emitted by the light source 31 is reflected forward by a reflective face 33*a* of the reflector 33. A portion of the light is blocked by the rotary shade 36. Thereupon, the shape of an end edge of the rotary shade 36 disposed at a rear focal point F of the projector lens 34 is projected as a portion of the peripheral edge of the light distribution pattern formed in front of the vehicle 10.

Figure 5A:
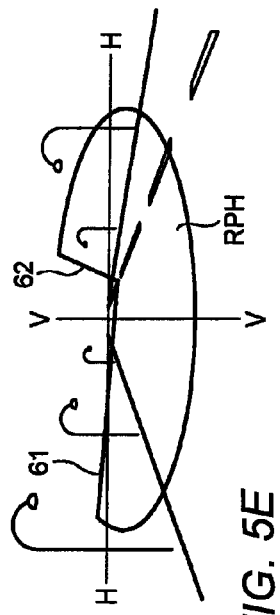
FIGS. 5A to 5F are drawings explaining relationships between rotation angle positions of a rotary shade and a light distribution pattern.

FIG. 5A illustrates a state where the first end edge 36*c*1 of the rotary shade 36 is disposed at the rear focal point F of the projector lens 34 as viewed from in front of the vehicle 10. In this state, a horizontal end edge 36*j*1 and an inclined end edge 36*j*2 appear at an upper end portion of the rotary shade 36.

The horizontal end edge 36*j*1 is disposed further to the right side than an optical axis A2 of the projector lens 34 as viewed from the driver's seat, and extends in a horizontal direction, and is formed by the first end edge 36*c*1 of the rotary shade 36. The inclined end edge 36*j*2 is disposed further to the left side than the optical axis A2 of the projector lens 34 as viewed from the driver's seat, and extends inclining downward on progression from the horizontal end edge 36*j*1 toward the second connecting portion 36*dm*, and is formed by a portion of the twisted end edge 36*c*4.

Figure 5B:
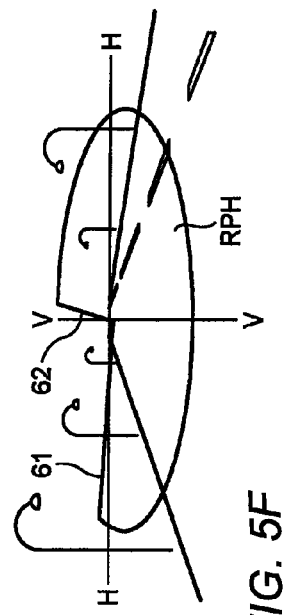
Figure 5C:
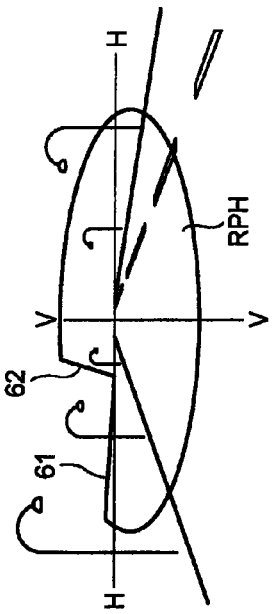
Figure 5D:
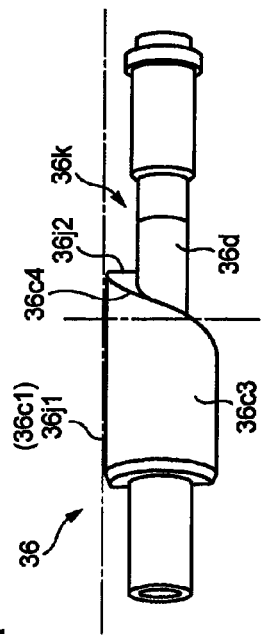

FIG. 5D is a drawing illustrating the light distribution pattern formed by the projection of the horizontal end edge 36*j*1 and the inclined end edge 36*j*2 onto a hypothetical vertical screen disposed in front of the vehicle 10. This light distribution pattern is formed as a right side partial high beam pattern RPH. The right side partial high beam pattern RPH includes a horizontal cutoff line 61 and an inclined cutoff line 62.

The horizontal cutoff line 61 is formed by the horizontal end edge 36*j*1, extends at somewhat of an angle with respect to the horizon H-H, and is used as a driving lane side cutoff line. The inclined cutoff line 62 is formed by the inclined end edge 36*j*2 (twisted end edge 36*c*4), and extends at an incline from a right end of the horizontal cutoff line 61 towards the upper right.

As illustrated in FIG. 5A, a space 36*k* through which the passage of light is possible is formed above the second connecting portion 36*d* that is at a left side of the inclined end edge 36*j*2 as viewed from the driver's seat. Light that has passed through the space 36*k* illuminates a region to a right side of the inclined cutoff line 62.

FIG. 5B illustrates a state wherein the rotary shade 36 has been rotated approximately 90 degrees toward the rear of the vehicle 10 from the state illustrated in FIG. 5A as viewed from in front of the vehicle 10. In this state, a horizontal end edge 36*m*1 and an inclined end edge 36*m*2 appear at an upper end portion of the rotary shade 36.

The horizontal end edge 36*m*1 is disposed further to the right side than the optical axis A2 of the projector lens 34 as viewed from the driver's seat, and extends in a horizontal direction, and is formed by the peripheral face 36*c*4 of the first connecting portion 36*c*. The inclined end edge 36*m*2 is disposed in the vicinity of the optical axis A2 of the projector lens 34, and extends from the horizontal end edge 36*m*1 inclined downwards on progression towards the second connecting portion 36*d*, and is formed by a portion of the twisted end edge 36*c*4.

Figure 5E:
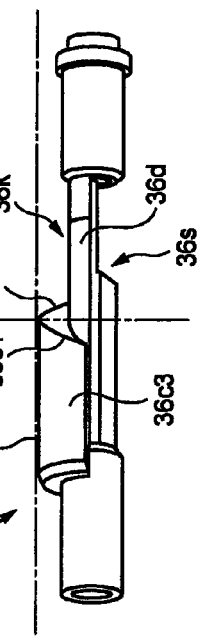

FIG. 5E is a drawing illustrating a light distribution pattern formed by projection of the horizontal end edge 36*m*1 and the inclined end edge 36*m*2 onto a hypothetical vertical screen disposed in front of the vehicle 10. This light distribution pattern is also formed as a right side partial high beam pattern RPH.

The horizontal cutoff line 61 is formed by the horizontal end edge 36*m*1, and extends at somewhat of an angle with respect to the horizon H-H, and is used as a driving lane side cutoff line. The inclined cutoff line 62 is formed by the inclined end edge 36*m*2 (the twisted end edge 36*c*4), and extends at an incline from the right end of the horizontal cutoff line 61 towards the upper right.

As illustrated in FIG. 5B, the space 36*k*, through which the passage of light is possible, is formed above the second connecting portion 36*d* that is at the left side of the inclined end edge 36*m*2 as viewed from the driver's seat. The light that passes through the space 36*k* illuminates a region at the right side of the inclined cutoff line 62.

FIG. 5C illustrates a state wherein the rotary shade 36 has been rotated approximately 90 degrees toward the rear of the vehicle 10 from the state illustrated in FIG. 5B as viewed from in front of the vehicle 10, and the second end edge 36*c*2 of the rotary shade 36 is disposed at the rear focal point F of the projector lens 34. In this state, a horizontal end edge 36p1 and an inclined end edge 36p2 appear at the upper end portion of the rotary shade 36.

The horizontal end edge 36p1 is disposed further to the right side than the optical axis A2 of the projector lens 34 as viewed from the driver's seat, extends in a horizontal direction, and is formed by the second end edge 36c2 of the first connecting portion 36c. The inclined end edge 36p2 is disposed further to the right side than the optical axis A2 of the projector lens 34 as viewed from the driver's seat, extends from the horizontal end edge 36p1 at a downward incline on progression toward the second connecting portion 36d, and is formed by a portion of the twisted end edge 36c4.

Figure 5F:
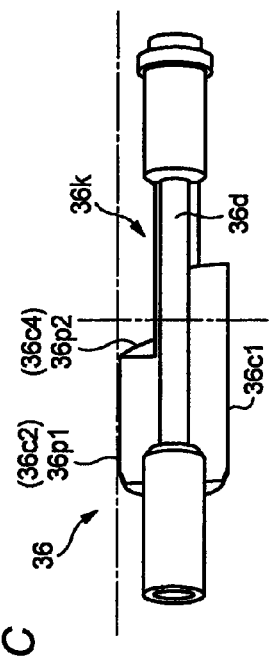

FIG. 5F is a drawing illustrating the light distribution pattern (an example of a second light distribution pattern) formed by the projection of the horizontal end edge 36p1 and the inclined end edge 36p2 onto a hypothetical vertical screen disposed in front of the vehicle 10. This light distribution pattern is also formed as a right side partial high beam pattern RPH, and the illuminated surface area is wider than that of the light distribution pattern (an example of a first light distribution pattern) illustrated in FIG. 5D.

The horizontal cutoff line 61 is formed by the horizontal end edge 36p1 (the second end edge 36c2), and extends at somewhat of an angle with respect to the horizon H-H, and is used as a driving lane side cutoff line. The inclined cutoff line 62 is formed by the inclined end edge 36p2 (the twisted end edge 36c4), and extends at an incline from the right end of the horizontal cutoff line 61 towards the upper right.

As illustrated in FIG. 5C, the space 36k, through which the passage of light is possible, is formed above the second connecting portion 36d that is at the left side of the inclined end edge 36p2 as viewed from the driver's seat. Light that has passed through the space 36k illuminates a region at the right side of the inclined cutoff line 62.

When the rotary shade 36 is rotated from the state illustrated in FIG. 5A to the state illustrated in FIG. 5C, the inclined cutoff line 62 of the twisted end edge 36c4 is shifted from a first end edge 36c1 side to a second end edge 36c2 side. The space 36k through which the passage of light is possible progressively widens in response to the rotation. The inclined cutoff line 62 accordingly is shifted progressively toward the left side, and the surface area of the illuminated region on the right side becomes larger. The horizontal cutoff line 61 becomes progressively shorter therewith.

Conversely, when the rotary shade 36 is rotated from the state illustrated in FIG. 5C to the state illustrated in FIG. 5A, the inclined cutoff line 62 of the twisted end edge 36c4 is shifted from a second end edge 36c2 side to a first end edge 36c1 side. The space 36k, through which the passage of light is possible, progressively narrows with the rotation. The inclined cutoff line 62 accordingly progressively is shifted toward the right side, and the surface area of the illuminated region on the right side becomes smaller. The horizontal cutoff line 61 progressively becomes longer therewith.

A left lamp unit 30L is housed in a lamp chamber 25L of the left headlamp unit 22L illustrated in FIG. 1. The left lamp unit 30L has a configuration with left-right symmetry to the right lamp unit 30R illustrated in FIG. 2. A left side partial high beam pattern LPH that is formed by the rotary shade 36 provided to the left lamp unit 30L has a shape with left-right symmetry to the shape of the right side partial high beam pattern RPH illustrated in FIG. 5D to FIG. 5F.

Figure 6A:
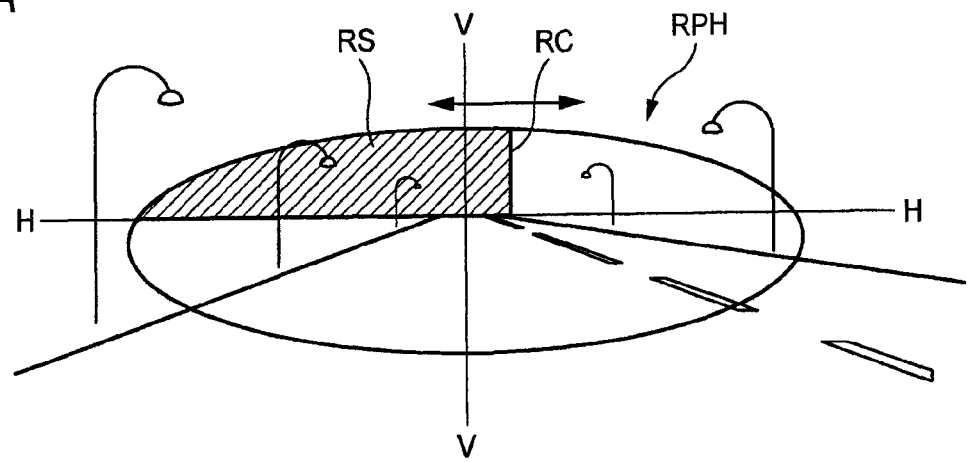
FIGS. 6A to 6C are drawings explaining a partial high beam pattern formed by left and right lamp units.
Figure 6B:
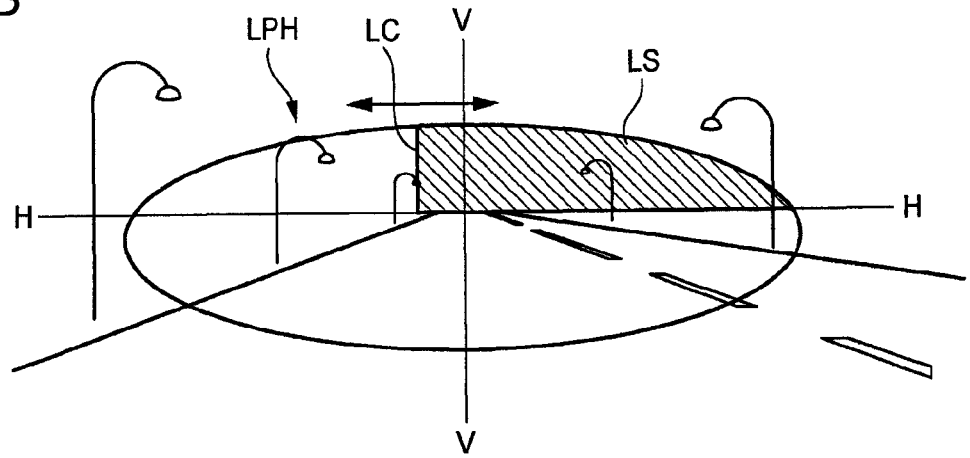

Description will be now described with reference to FIGS. 6A to 6C regarding a light distribution pattern formed by the right lamp unit 30R and the left lamp unit 30L of the above configuration. FIG. 6A is a schematic view illustrating the right side partial high beam pattern RPH formed by the right lamp unit 30R. FIG. 6B is a schematic view illustrating the left side partial high beam pattern LPH formed by the left lamp unit 30L. For ease of explanation, the inclined cutoff line 62 of the right side partial high beam pattern RPH is indicated by a right side cutoff line RC, and the inclined cutoff line 62 of the left side partial high beam pattern LPH is indicated by a left side cutoff line LC.

In the right lamp unit 30R, a portion of the light emitted by the light source 31 is blocked by the rotary shade 36, and a right side shadow region RS is thereby formed in a portion of the high beam pattern as illustrated in FIG. 6A. The right side cutoff line RC is shifted in a left-right direction within a high beam illuminated region according to the angle position by rotating the rotary shade 36, and the surface area of the right side shadow region RS changes thereby.

In the left lamp unit 30L, a portion of the light emitted by the light source 31 is blocked by the rotary shade 36, and a left side shadow region LS is thereby formed in a portion of a high beam pattern as illustrated in FIG. 6B. A left side cutoff line LC is shifted in a left-right direction within a high beam illuminated region according to the angle position by rotating of the rotary shade 36, and the surface area of the left side shadow region LS changes thereby.

Figure 6C:
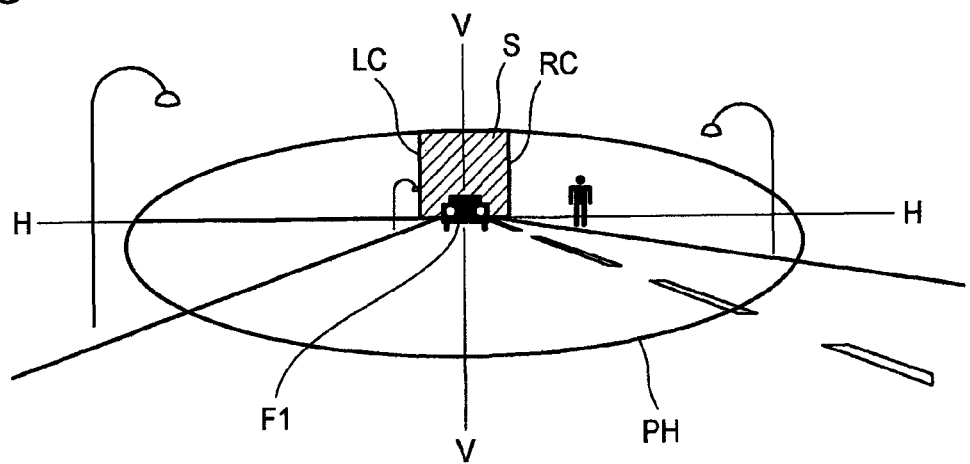

FIG. 6C illustrates a partial high beam pattern PH obtained by superimposing the right side partial high beam pattern RPH and the left side partial high beam pattern LPH. A portion where the right side shadow region RS and the left side shadow region LS are overlapped with each other forms a shadow region S.

The shadow region S is formed in order to suppress dazzling a vehicle or similar ahead that is detected in the high beam illuminated region. In FIG. 6C, a vehicle ahead F1 is present in the same driving lane as the vehicle 10, and the positions of the right side cutoff line RC and the left side cutoff line LC are set such that the vehicle ahead F1 exists within the shadow region S.

In cases where there is no vehicle or similar present in front, the rotary shades 36 in the right lamp unit 30R and the left lamp unit 30L are rotated to an angle position at which the light emitted from each light source 31 is not blocked. Specifically, the rotary shade 36 is rotated 180 degrees from the state illustrated in FIG. 5B, such that a space 36s is disposed above the rotary shade 36. Light emitted from the light source 31 passes through the space 36s and illuminates ahead, and a high beam pattern (not illustrated in the drawings) is formed that does not contain the shadow region S.

The integrated controller 14 detects whether or not there are any vehicles, pedestrians or similar ahead based on vehicle 10 forward images acquired by the camera 18, and determines whether or not it is necessary to form a partial high beam pattern PH. When determined that it is necessary to form the partial high beam pattern PH, the position and range wherein the shadow region S should be formed are determined based on the position of the target object detected through the camera 18, the speed of the vehicle 10 detected by the car wheel speed sensors 16, and the direction of travel of the vehicle 10 detected by the steering angle sensor 17.

As described above, the position and range of the shadow region S are determined by the positions of the right side cutoff line RC and the left side cutoff line LC, namely, by the angle positions of each of the rotary shades 36. The integrated controller 14 generates a control signal that rotates each of the rotary shades 36 to an angle position capable of achieving the determined angle and range of the shadow region S, and transmits the control signal to the drive mechanisms 37 of both the right lamp unit 30R and the left lamp unit 30L.

The drive mechanisms 37 of the right lamp unit 30R and the left lamp unit 30L rotate each of the rotary shades by a direction and angle in response to the control signal, and a portion of the light emitted by the light source 31 and reflected by the reflector 33 is blocked. A partial high beam pattern PH with a desired shadow region S is thereby formed in front of the vehicle 10.

Figure 3B:
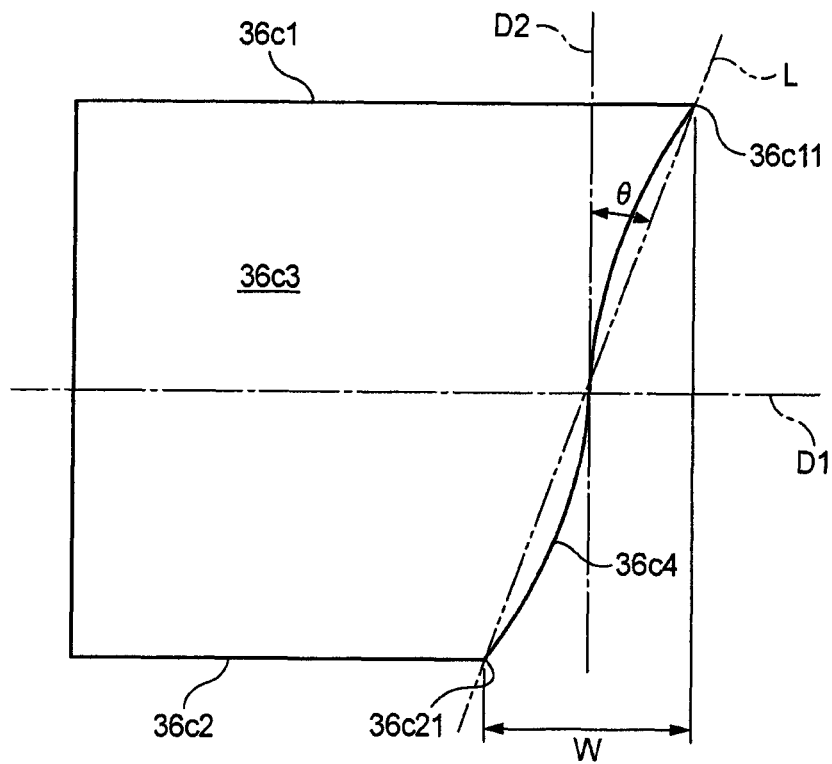

FIG. 3B is an opened-out view viewed along the plane of the peripheral face 36c4 of the first connecting portion 36c. Reference numeral D1 indicates a direction parallel to the rotation axis A1 of the rotary shade 36. The reference numeral D2 indicates an imaginary plane that is orthogonal to the rotation axis A1. In the opened-out view the "direction orthogonal to the rotation axis A1" is defined unambiguously. It is apparent that the twisted end edge 36c4 intersects with the first end edge 36c1 and the second end edge 36c2 respectively at different positions in the rotation axis A1 direction.

Reference numeral W in FIG. 3B corresponds to the movement range of the right side cutoff line RC (inclined cutoff line 62). The greater this range, the greater the extent of possible shadow region S movement (or the extent of possible change in shape) in order to track for example vehicles ahead. The angle θ formed between a straight line L connecting the respective points where the twisted end edge 36c4 intersects with the first end edge 36c1 and the second end edge 36c2 (namely, each of the end edge left ends 36c11, 36c21), and the imaginary plane D2 that is orthogonal to the rotation axis A1 may be made greater to make the movement range W greater.

However if, as described above, the incline of the twisted end edge 36c4 employed in projection were lessened, the boundary of the left side shadow region RS would become indistinct. Moreover, of the light projecting toward the projector lens 34, the amount of the light blocked by the twisted end face 36c5 would increase, with the brightness in the vicinity of the right side cutoff line RC thereby being lowered.

Therefore in the present exemplary embodiment, the rotation axis A1 of the right lamp unit 30R rotary shade 36 is disposed so as to incline along a front-rear direction with respect to an imaginary plane P1 that is orthogonal to the optical axis A2 of the projector lens 34, as illustrated in FIG. 4. The inclination angle φ is set smaller than the angle θ.

Moreover, a reflective face portion 33a1 of the reflector 33 is configured so as to reflect a portion of the light emitted by the light source 31 in a direction parallel to the twisted end edge 36c4 as illustrated in FIG. 4A.

Figure 7A:
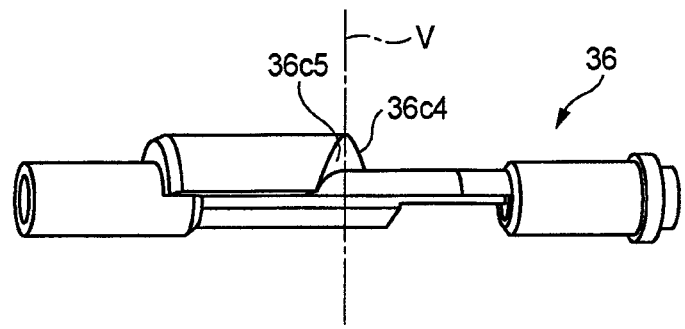
FIGS. 7A to 7C are drawings explaining apparent incline of a twisted end edge of a rotary shade.
Figure 7B:
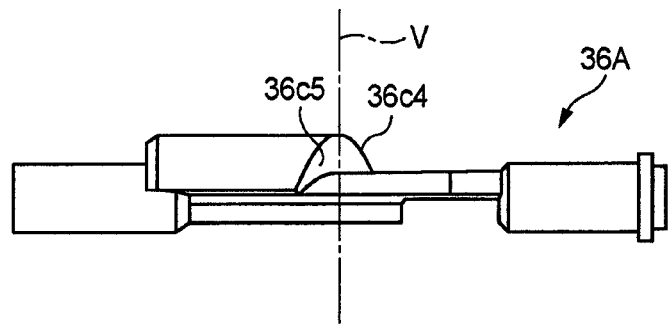

FIG. 7A is an external view of the rotary shade 36 with the inclination angle φ as viewed from the front of the vehicle 10. FIG. 7B illustrates a case wherein the inclination angle φ is 0 degrees; namely, FIG. 7B is an external view of a conventional rotary shade 36A of related art that has a rotation axis A1 disposed parallel to the plane P1 that is orthogonal to the projector lens 34 optical axis A2, as viewed from the front of the vehicle 10.

The movement ranges W of the right side cutoff lines RC obtained from both of the twisted end edges 36c4 are identical. However, the incline appears steeper in the twisted end edge 36c4 of the rotary shade 36 according to the present exemplary embodiment than in the twisted end edge 36c4 of the rotary shade 36A that is conventionally disposed (the rotary shade 36 twisted end edge 36c4 appears closer to vertical axis V). Namely, when the twisted end edge 36c4 of the rotary shade 36 according to the present exemplary embodiment is projected by light traveling in a direction parallel to the projector lens 34 optical axis A2, the incline of the right side cutoff line RC can be made almost vertical. Accordingly, a clear boundary between the right side shadow region RS and the right side cutoff line RC can be made without narrowing the movement range of the right side cutoff line RC.

Moreover, the rotary shade 36 according to the present exemplary embodiment enables a reduction in the amount of the light out of the light projecting toward the projector lens 34 that is blocked by the twisted end face 36c5. Accordingly, a reduction in brightness in the vicinity of the right side cutoff line RC can be suppressed.

Figure 7C:
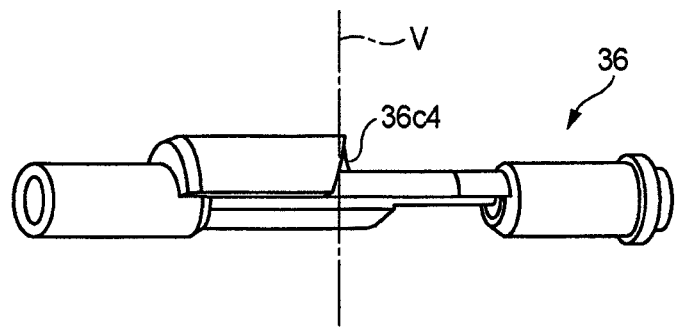

FIG. 7C is an exterior view of the rotary shade 36 according to the present exemplary embodiment as viewed along the direction of travel of light reflected by the portion 331a1 of the reflective face of the reflector 33 (namely, a direction parallel to twisted end edge 36c4) illustrated in FIG. 4A.

As is apparent from comparison of FIG. 7A and FIG. 7C, when viewed along this direction the apparent incline of the twisted end edge 36c4 is steeper (the twisted end edge 36c4 appears closer to the vertical axis V) than when viewed from the front. Namely, when the twisted end edge 36c4 is projected by light reflected by the reflective face portion 33a1 configured as described above, the right side cutoff line RC that is formed can be tilted even closer to vertical. Accordingly, a clearer boundary between the right side cutoff line RC and the right side shadow region RS can be made.

Moreover, the light moving parallel to the twisted end edge 36c4 by the twisted end face 36c5 is not readily blocked, and therefore any reduction in brightness the vicinity of the right side cutoff line RC can be suppressed to a minimum.

The rotary shade 36 in the left lamp unit 30L is disposed with left-right symmetry to the configuration illustrated in FIG. 4A. In other regards it is as described above, and redundant description is therefore omitted.

The exemplary embodiment described above is given to aid understanding of the invention, however the invention is not limited thereto. Modifications and improvements may be made without deviating from the spirit of the invention, and obviously the invention includes such equivalent embodiments.

Figure 8A:
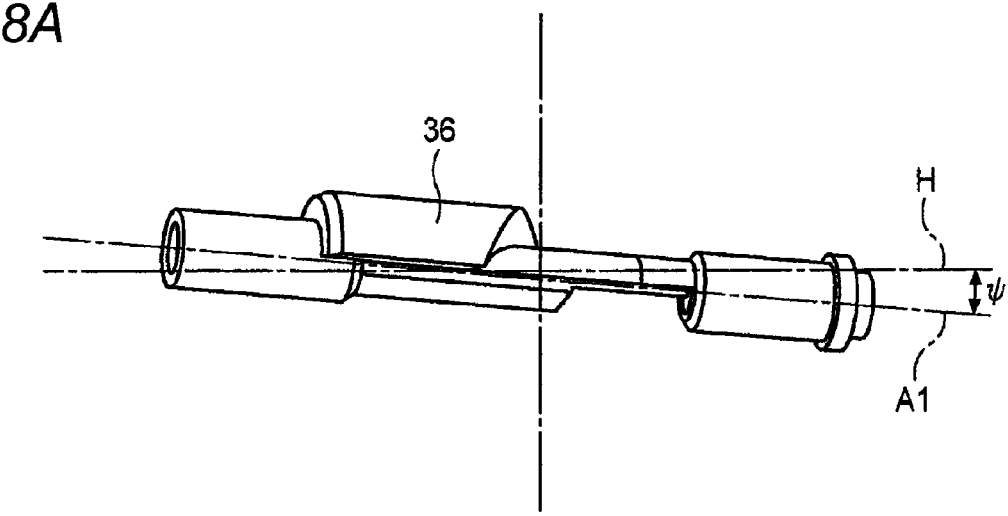
FIGS. 8A and 8B are drawings explaining placement of a rotary shade according to a modified example.
Figure 8B:
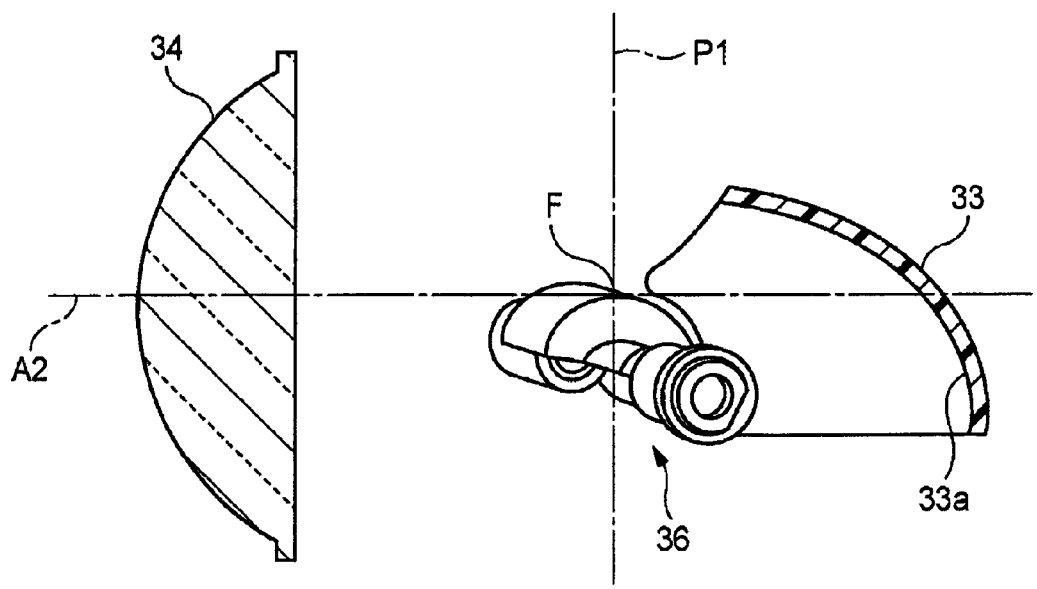

The rotation axis A1 of the rotary shade 36 installed to the right lamp unit 30R may also be disposed at an incline along the up-down direction as illustrated in FIG. 8A and FIG. 8B. FIG. 8A illustrates an external view as viewed from the front of the vehicle 10, and FIG. 8B illustrates an external view as viewed from the left side (illustrates cross-sections of the reflector 33 and the projector lens 34 corresponding to FIG. 4B).

Figure 9A:
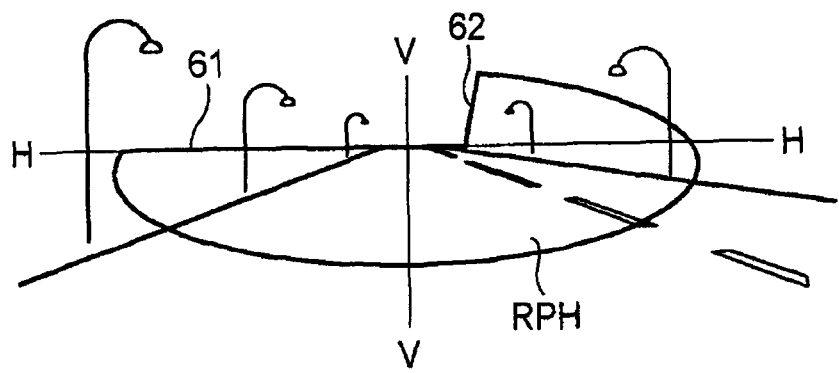
FIGS. 9A to 9C are drawings illustrating a light distribution pattern formed by the rotary shade of FIG. 8.
Figure 9B:
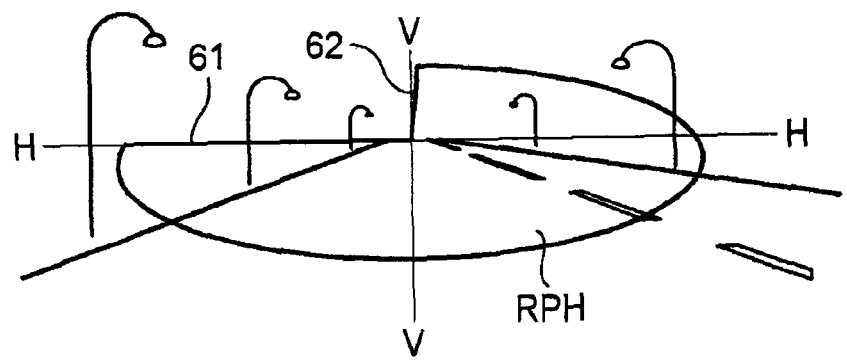
Figure 9C:
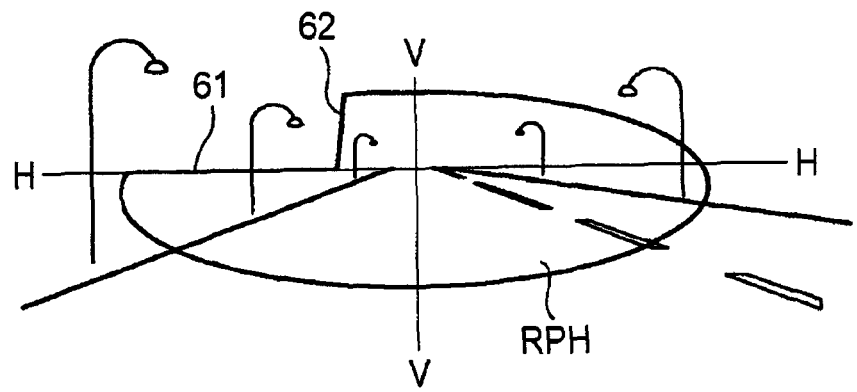

FIGS. 9A to 9C illustrate light distribution patterns formed by the rotary shade 36 when disposed as described above. The light distribution pattern illustrated in FIG. 9A is formed when the rotary shade 36 is rotated to the angle position illustrated in FIG. 5A. Similarly, the light distribution patterns illustrated in FIG. 9B and FIG. 9C are formed when the rotary shade 36 is rotated to the angle positions illustrated in FIG. 5B and FIG. 5C respectively.

Distortion (namely, the incline of the horizontal cutoff line 61) of the projected image arising from the rotation axis A1 being inclined along the front-rear direction can be alleviated by disposing in this manner. Moreover, the incline of inclined cutoff line 62 can be brought closer to the vertical axis V. Accordingly, an angle ψ formed between the rotation axis A1 and a horizontal axis H can be set appropriately according to the angle φ formed by the imaginary plane P1 that is orthogonal to the optical axis A2 and the rotation axis A1 (namely, according to the distortion that arises).

In the exemplary embodiment, the illuminated surface area of the light distribution pattern formed when the first end edge 36c1 that intersects with one end of the twisted end edge 36c4 is disposed at the rear focal point F of the projector lens 34 is a smaller partial high beam pattern than the partial high beam pattern formed when the second end edge 36c2 that intersects with the other end of the twisted end edge 36c4 is disposed at the rear focal point F of the projector lens 34. However, the light distribution pattern formed by the projection of an end edge that intersects the one end of the twisted end edge 36c4 may for example be a low beam pattern.

Figure 10A:
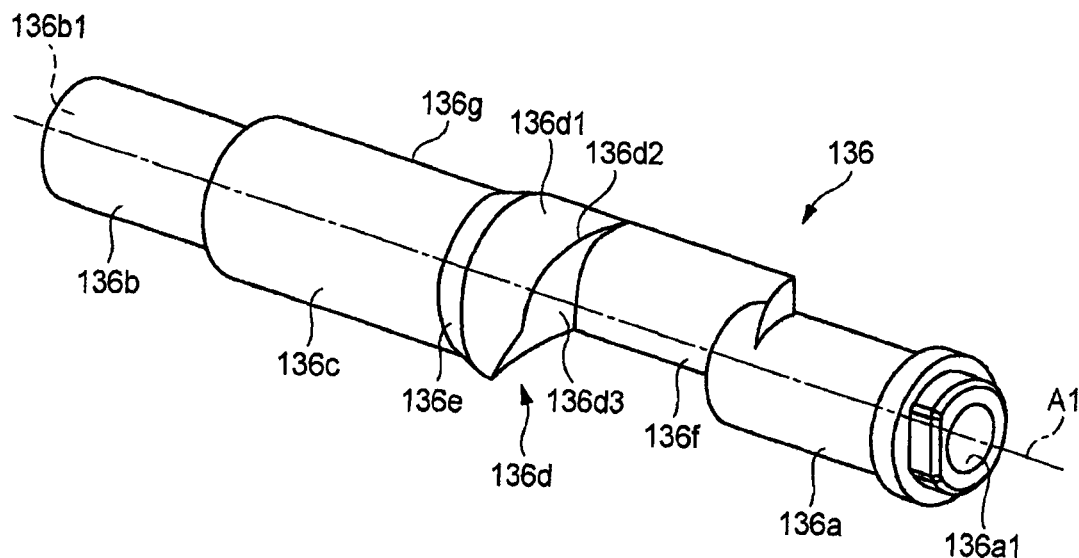
FIGS. 10A and 10B are external perspective views illustrating a rotary shade according to another modified example.
Figure 10B:
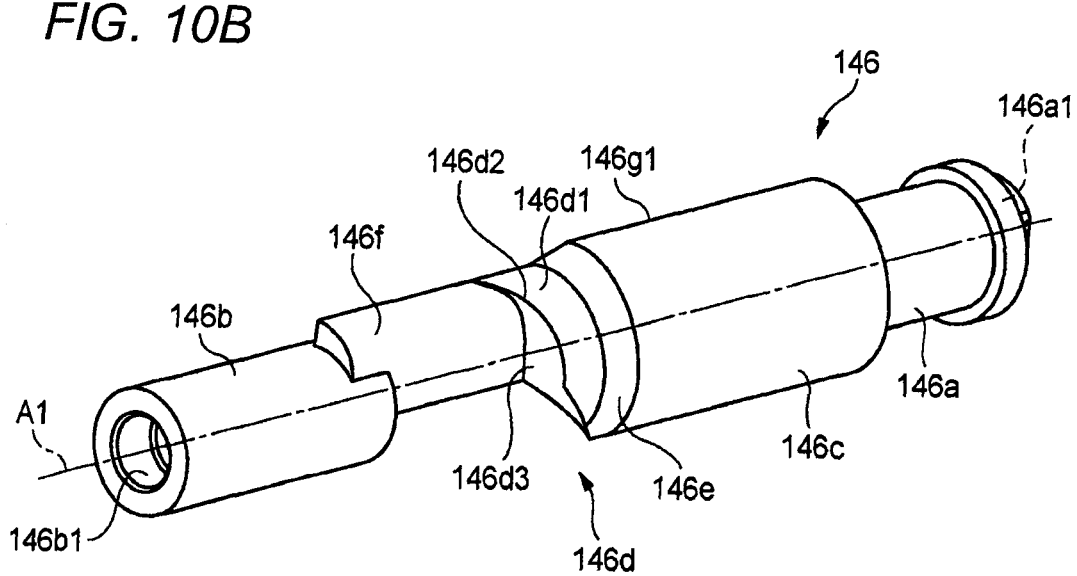

In such a configuration, the shapes of the rotary shade installed to the right lamp unit 30R and the rotary shade installed to the left lamp unit 30L have left-right symmetry to each other. FIG. 10A is a perspective view illustrating a right rotary shade 136 installed to the right lamp unit 30R. FIG. 10B is a perspective view illustrating a left rotary shade 146 installed to the left lamp unit 30L.

The right rotary shade 136 is provided with a left side circular cylinder portion 136a, a right side circular cylinder portion 136b, a first connecting portion 136c, a second connecting portion 136d, a third connecting portion 136e, and a fourth connecting portion 136f.

The cross-section profile of the left side circular cylinder portion 136a as viewed along the rotation axis A1 direction has the shape of a concentric circle centered on the rotation axis A1. A shaft hole 136a1 is formed to the left side circular cylinder portion 136a coaxial with the rotation axis A1. The shaft hole 136a1 is joined to the drive mechanism 37.

The cross-section profile of the right side circular cylinder portion 136b as viewed along the rotation axis A1 direction has the shape of a concentric circle centered on the rotation axis A1. A shaft hole 136b1 is formed to the right side circular cylinder portion 136b coaxial with the rotation axis A1. The shaft hole 136b1 is supported by the supporting mechanism 38.

The first connecting portion 136c is a portion that is formed contiguously to the right side circular cylinder portion 136b, and is disposed at a left side of the right side circular cylinder portion 136b as viewed from the driver's seat. The cross-section profile of the first connecting portion 136c is a concentric semi-circle centered on the center of the rotation axis A1 as viewed along the rotation axis A1 direction. The radius of the concentric semi-circle is greater than the radius of the concentric circle that forms the cross-section of the right side circular cylinder portion 136b.

The second connecting portion 136d is disposed at a left side of the first connecting portion 136c as viewed from the driver's seat, and is provided with a circular cylinder portion 136d1, a twisted end edge 136d2, and a twisted end face 136d3. The underlying cross-section profile of the circular cylinder portion 136d1 as viewed along the rotation axis A1 direction is a concentric semi-circle centered on the center of the rotation axis A1, with one portion of the circular cylinder portion 136d1 presenting a notched shape of the twisted end face 136d3. The radius of the concentric semi-circle is greater than the radius of the concentric circle that forms the cross-section of the first connecting portion 136c.

The third connecting portion 136e is formed contiguously to and connecting together the first connecting portion 136c and the circular cylinder portion 136d1 of the second connecting portion 136d. Namely, the third connecting portion 136e is a face that extends around the rotation axis A1 and inclined along the rotation axis A1 direction so as to connect together the semi-circular cylinder shaped peripheral face formed by the first connecting portion 136c and the peripheral face formed by the circular cylinder portion 136d1 of the second connecting portion 136d.

The fourth connecting portion 136f is formed contiguously to and connecting together the left side circular cylinder portion 136a and the twisted end face 136d3 of the second connecting portion 136d.

Figure 11A:
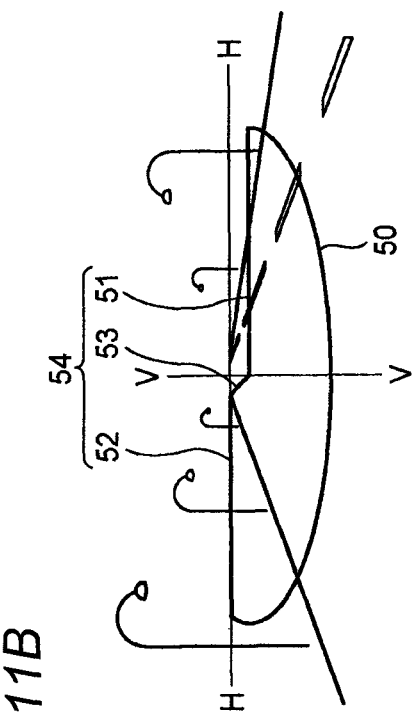
FIGS. 11A to 11D are drawings explaining a low beam pattern formed by a rotary shade according to another modified example.

Portions of the peripheral faces formed by the first connecting portion 136c, the second connecting portion 136d, the third connecting portion 136e, and the fourth connecting portion 136f are respectively beveled to form a flat end edge 136g that extends parallel to the rotation axis A1 direction. FIG. 11A illustrates a state wherein the right rotary shade 136 has been rotated by the drive mechanism 37 to an angle position where the end edge 136g is disposed at the rear focal point F of the projector lens 34 as viewed from the front of the vehicle 10.

In this state, the end edge 136g includes a first horizontal portion 136g1, a second horizontal portion 136g2, and an inclined portion 136g3. The first horizontal portion 136g1 is disposed further to the left side than the optical axis A2 of the projector lens 34 as viewed from the driver's seat, extends in a horizontal direction, and is formed by the second connecting portion 136d and the fourth connecting portion 136f. The second horizontal portion 136g2 is disposed further to the right side than the optical axis A2 of the projector lens 34 as viewed from the driver's seat, extends in a horizontal direction, and is formed by the first connecting portion 136c. The inclined portion 136g3 extends from the first horizontal portion 136g1 towards the second horizontal portion 136g2 so as to incline downward, and is formed by the third connecting portion 136e.

Figure 11B:
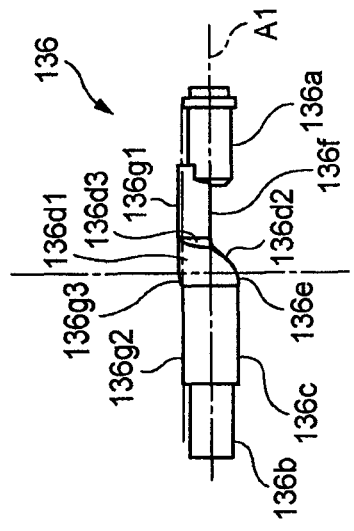

FIG. 11B is a drawing illustrating a light distribution pattern formed by the projection of the end edge 136g onto a hypothetical vertical screen disposed in front of the vehicle 10. The light distribution pattern corresponds to a right side low beam pattern 50 (an example of a first light distribution pattern).

The right side low beam pattern 50 includes a first horizontal cutoff line 51, a second horizontal cutoff line 52, and an inclined cutoff line 53 at the upper end edge thereof. In the following description, the first horizontal cutoff line 51, the second horizontal cutoff line 52, and the inclined cutoff line 53 are referred to collectively as the "right lateral cutoff line 54" as appropriate.

The first horizontal cutoff line 51 is formed by the first horizontal portion 136g1 of the end edge 136g, extends horizontally just below the horizon H-H, and is used as an oncoming vehicle lane side cutoff line. The second horizontal cutoff line 52 is formed by the second horizontal portion 136g2 of the end edge 136g, extends along the horizon H-H and is used as a driving lane side cutoff line. The inclined cutoff line 53 is formed by the inclined portion 136g3 of the end edge 136g, extends at an incline from a left end of the first horizontal cutoff line 51 toward the upper left, and is connected to a right end of the second horizontal cutoff line 52.

Namely, when the drive mechanism 37 rotates the right rotary shade 136 to the position illustrated in FIG. 11A, the end edge 136g is projected to the front of the projector lens 34 as the right lateral cutoff line 54. Light passing above the end edge 136g illuminates below the right lateral cutoff line 54 as the right side low beam pattern 50.

As illustrated in FIG. 10B, the left rotary shade 146 is provided with a left side circular cylinder portion 146a, a right side circular cylinder portion 146b, a first connecting portion 146c, a second connecting portion 146d, a third connecting portion 146e, and a fourth connecting portion 146f.

The cross-section profile of the left side circular cylinder portion 146a as viewed along the rotation axis A1 direction is a concentric semi-circle that is centered on the center of the rotation axis A1. A shaft hole 146a1 that is coaxial to the rotation axis A1 is formed in the left side circular cylinder portion 146a. The shaft hole 146a1 is joined to the drive mechanism 37.

The cross-section profile of the right side circular cylinder portion 146b as viewed along the rotation axis A1 direction is a concentric semi-circle that is centered on the center of the rotation axis A1. A shaft hole 146b1 that is coaxial to the rotation axis A1 is formed in the right side circular cylinder portion 146b. The shaft hole 146b1 is supported by the supporting mechanism 38.

The first connecting portion 146c is formed contiguously to the left side circular cylinder portion 146a, and is disposed at a right side of the left side circular cylinder portion 146a as viewed from the driver's seat. The cross-section profile of the first connecting portion 146c as viewed along the rotation axis A1 direction is a concentric semi-circle centered on the rotation axis A1. The radius of the concentric semi-circle is greater than the radius of the concentric circle that forms the cross-section of the left side circular cylinder portion 146a.

The second connecting portion 146d is disposed at a right side of the first connecting portion 146c as viewed from the driver's seat, and is provided with a circular cylinder portion 146d1, a twisted end edge 146d2, and a twisted end face 146d3. The cross-section profile of the circular cylinder portion 146d1 as viewed along the rotation axis A1 direction is based on a concentric semi-circle centered on the center of the rotation axis A1. One portion of the circular cylinder portion 146d1 presents a notched shape of the twisted end face 146d3. The radius of the concentric semi-circle is less than the concentric circle that forms the cross-section of the first connecting portion 146c.

The third connecting portion 146e is formed contiguously to and connecting together the first connecting portion 146c and the circular cylinder portion 146d1 of the second connecting portion 146d. Namely, the third connecting portion 146e is a face that extends around the rotation axis A1 and inclined along the rotation axis A1 direction so as to connect together the semi-circular cylinder shaped peripheral face of formed by the first connecting portion 146c and the peripheral face of the semi-circular cylinder formed by the circular cylinder portion 146d1 of the circular cylinder portion 146d.

The fourth connecting portion 146f is formed contiguously to and connecting together the right side circular cylinder portion 146b and the twisted end face 146d3 of the second connecting portion 146d.

Figure 11C:
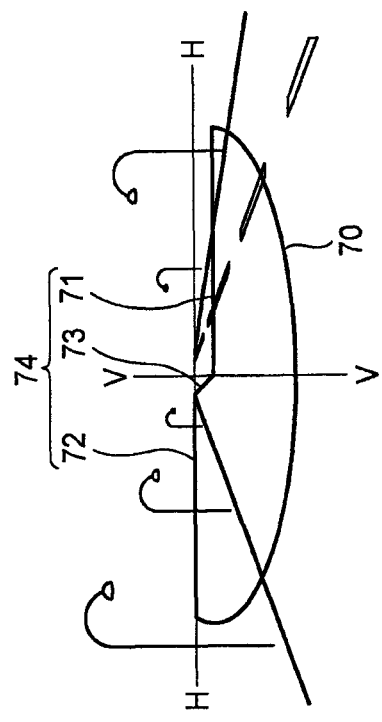

Portions of the peripheral face formed by the first connecting portion 146c, the second connecting portion 146d, the third connecting portion 146e, and the fourth connecting portion 146f are respectively beveled to form a flat end edge 146g that extends parallel to the rotation axis A1 direction. FIG. 11C illustrates a state wherein the left rotary shade 146 has been rotated by the drive mechanism 37 to an angle position where the end edge 146g is disposed at the rear focal point F of the projector lens 34 as viewed from the front of the vehicle 10.

In this state, the end edge 146g includes a first horizontal portion 146g1, a second horizontal portion 146g2, and an inclined portion 146g3. The first horizontal portion 146g1 is disposed further to the left side than the optical axis A2 of the projector lens 34 as viewed from the driver's seat, extends in a horizontal direction, and is formed by the first connecting portion 146c. The second horizontal portion 146g2 is disposed further to the right side than the optical axis A2 of the projector lens 34 as viewed from the driver's seat, extends in a horizontal direction, and is formed by second connecting portion 136d and fourth connecting portion 146f. The inclined portion 146g3 extends from the first horizontal portion 146g1 towards the second horizontal portion 146g2 while inclining downwards, and is formed by the third connecting portion 146e.

Figure 11D:
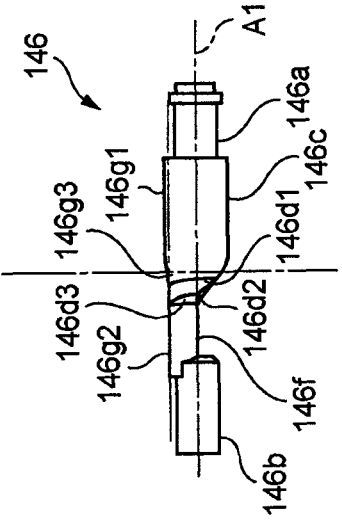

FIG. 11D is a drawing illustrating a light distribution pattern formed by the projection of the end edge 146g onto a hypothetical vertical screen disposed in front of the vehicle 10. The light distribution pattern corresponds to a left side low beam pattern 70 (an example of a first light distribution pattern).

The left side low beam pattern 70 includes a first horizontal cutoff line 71, a second horizontal cutoff line 72, and an inclined cutoff line 73 at an upper end edge thereof. In the description, the first horizontal cutoff line 71, the second horizontal cutoff line 72, and the inclined cutoff line 73 are referred to collectively as the "left lateral cutoff line 74" as appropriate.

The first horizontal cutoff line 71 is formed by the first horizontal portion 146g1 of the end edge 146g, extends horizontally just below the horizon H-H, and is used as an oncoming vehicle lane side cutoff line. The second horizontal cutoff line 72 is formed by the second horizontal portion 146g2 of the end edge 146g, extends along the horizon H-H and is used as a driving lane side cutoff line. The inclined cutoff line 73 is formed by the inclined portion 146g3 of the end edge 146g, extends at an incline from a left edge of the first horizontal cutoff line 71 toward the upper left, and is connected to a right end of the second horizontal cutoff line 72.

Namely, when the drive mechanism 37 rotates the right rotary shade 146 to the position illustrated in FIG. 11D, the end edge 146g is projected to the front of the projector lens 34 as the right lateral cutoff line 74. Light passing above the end edge 146g illuminates below the right lateral cutoff line 74 as the right side low beam pattern 70.

In the exemplary embodiment described above, primarily from the point of view of ease of countering chromatic aberration, a semiconductor light-emitting element is used as the light source 31, and a resin lens is used as the projector lens 34. However, a laser light source, a lamp light source (such as an incandescent lamp, a halogen lamp, a discharge lamp or a neon lamp) or the like may also be used as the light source 31. Moreover, a glass lens may be used as the projector lens 34.

The shapes of the twisted end edge 36c4 of the rotary shade 36, the twisted end edge 136d2 of the right rotary shade 136, and the twisted end edge 146d2 of the left rotary shade 146 are not limited to the descriptions given above. The shapes thereof may be set as appropriate according to the position and shape forming the right side cutoff line RC and the left side cutoff line LC, as long as the positions of each of the cutoff lines can be continuously varied in response to rotation of the respective rotary shades.

The expressions "front-rear", "left-right", and "up-down", in particular in the description of the inclination angle of the rotary shade 36, are used for the sake of convenience in describing positional relationships within the lamp unit, and are not intended to limit the directions in an actual usage state of the lamp units.

What is claimed is:

1. A lamp unit which is to be installed in a vehicle, the lamp unit comprising:
   a light source;
   a projector lens having an optical axis, wherein at least a portion of light emitted from the light source passes through the projector lens;
   a rotary shade that is disposed behind the projector lens so as to block a portion of the light emitted from the light source and that has a rotation axis; and a drive mechanism that rotates the rotary shade about the rotation axis, wherein the rotary shade comprises:
- a first end edge for forming a cutoff line of a first light distribution pattern projected in front of the projector lens, when the drive mechanism rotates the rotary shade to a first angle position;
- a second end edge for forming a first cutoff line of a second light distribution pattern projected in front of the projector lens, when the drive mechanism rotates the rotary shade to a second angle position different from the first angle position, wherein an illumination region of the second light distribution pattern is larger than that of the first light distribution pattern;
- a twisted end edge that extends around the rotation axis so as to intersect with the first end edge and the second end edge, wherein a position of a first intersect point of the twisted end edge and the first end edge is different from that of a second intersect point of the twisted end edge and the second end edge in a direction parallel to the rotation axis, the twisted end edge for forming a second cutoff line of the second light distribution pattern, wherein the second cutoff line is shifted in accordance with the rotation of the rotary shade, wherein a first inclination angle is formed between the rotation axis and a first imaginary plane that is orthogonal to an optical axis of the projector lens.

2. The lamp unit of claim 1, wherein the rotary shade further comprises:

a peripheral face that extends between the first end edge and the second end edge such that the peripheral face extends around the rotation axis, and wherein the first inclination angle is smaller than an angle formed between a second imaginary plane that is orthogonal to the rotation axis and a straight line connecting the first intersect point and the second intersect point.

3. The lamp unit of claim 1, wherein a second inclination angle is formed between the rotation axis and a third imaginary plane that is parallel to the optical axis.

4. The lamp unit of claim 1, further comprising:

a reflector that reflects a portion of the light emitted from the light source in a direction parallel to a portion of the twisted end edge.

5. The lamp unit of claim 1, wherein the first cutoff line is a horizontal cutoff line, and the second cutoff line is an inclined cutoff line, and the second light distribution pattern illuminates a region having the horizontal cutoff line as an upper edge portion and a region having the inclined cutoff line as a side edge portion.

6. The lamp unit of claim 5, wherein the first light distribution pattern is formed as a low beam light distribution pattern.

7. The lamp unit of claim 1, wherein the first imaginary plane extends in a parallel direction with a light entry surface of the projection lens.

8. The lamp unit of claim 1, wherein the light entry surface corresponds to a surface of the projection lens through which the light emitted from the light source enters the projector lens.

9. The lamp unit of claim 2, wherein the second imaginary plane extends in an intersecting direction of the first imaginary plane.

10. The lamp unit of claim 3, wherein the third imaginary plane extends in perpendicular direction to the first imaginary plane.

11. The lamp unit of claim 10, wherein the third imaginary plane extends in perpendicular direction to a gravitational axis.

* * * * *